Sept. 4, 1962 R. F. POST 3,052,617
STELLARATOR INJECTOR
Filed June 23, 1959 2 Sheets-Sheet 1
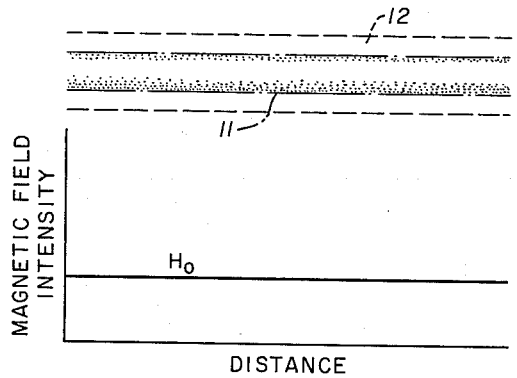
Fig. 1.
Fig. 2.
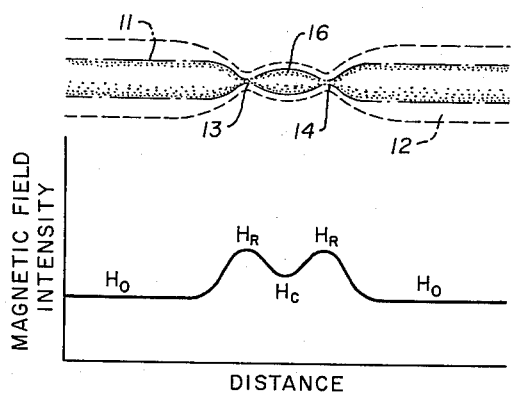
Fig. 3.
Fig. 4.
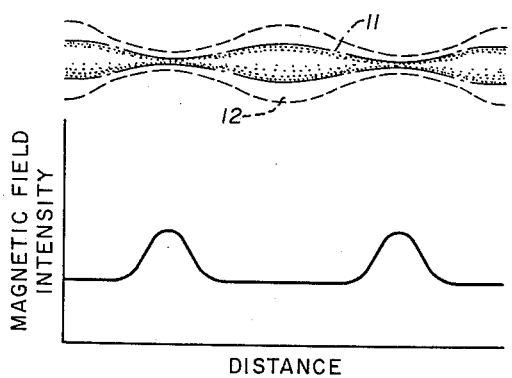
Fig. 5.
Fig. 6.
INVENTOR.
RICHARD F. POST
BY
ATTORNEY.

INVENTOR.
RICHARD F. POST
BY
ATTORNEY.

United States Patent Office 3,052,617
Patented Sept. 4, 1962

3,052,617
STELLARATOR INJECTOR
Richard F. Post, Walnut Creek, Calif., assignor to the United States of America as represented by the United States Atomic Energy Commission
Filed June 23, 1959, Ser. No. 822,404
6 Claims. (Cl. 204—193.2)

The present invention relates to the injection of atomic constituents into a column of plasma contained by axial lines of magnetic force, and more particularly to method and means for replenishing reactant material to a stellarator.

The term "stellarator" is widely accepted and employed herein as designating a device of the general character disclosed in "Proceedings of the Second United Nations International Conference on the Peaceful Uses of Atomic Energy," volume 32, Controlled Fusion Devices, United Nations Publication, Geneva, 1958, pages 181–196. As described therein a "stellarator" is a device for the confinement and heating of an ionized gas or plasma in a magnetic confinement field in which each single line of force, followed indefinitely, generates an entire toroidal surface. In other words, a stellarator magnetic field is one which has a twisted toroidal configuration and which therefore possesses a rotational transform. As noted in the publication, several alternatives are possible in the generation of such a field. A planar toroidal vacuum envelope may be provided which carries coils to generate an axial magnetic confining field through the envelope. A magnetic transverse field whose direction rotates with distance along the magnetic axis is superimposed upon the axial field to thus produce a resultant confinement field of twisted toroidal configuration within the envelope. Alternatively, the confinement field may be produced in a vacuum envelope of twisted toroidal or figure-8 configuration which carries coils to generate a magnetic field axially of the envelope. Since the envelope is twisted, so is the confinement field. This latter alternative is historically the first geometry proposed for the generation of a stellarator confinement field and is embodied in the complete stellarator device disclosed in the copending application of Lyman Spitzer, Jr., Serial No. 239,419, which matured into U.S. Patent No. 2,910,414 on October 27, 1959. As disclosed in said patent, the stellarator embodiment thereof includes a twisted toroidal or figure-8 shaped container or envelope in which an axial magnetic confinement field is established, the confinement field being thus also of twisted toroidal configuration. A reactant plasma is confined within the field and heated to high kinetic temperatures conducive to the establishment of various nuclear reactions between the plasma constituents. The confined plasma constituent particles are heated or accelerated in the container by the magnetic confining field and in some instances by an applied alternating magnetic field to induce neutron producing reactions in the reactant plasma. In addition, at least one point in the length of the container a gap is provided together with means to divert the magnetic field lines in the peripheral portions of the container at the gap radially therethrough. Such means are commonly referred to as a "diverter" and in the stellarator, the employment of at least one diverter facilitates the maintenance of steady-state operating conditions by removing reactants and neutral gas diffusing through the outer peripheral regions of the plasma column toward the material walls of the container for recovery and injection as fresh or enriched reactant material to the plasma. More particularly, in each diverter a thin shell of magnetic field lines next to the material walls of the container is bent radially outward from the container axis and any unreacted reactants, reacted particles, impurities, and the like in the outer peripheral regions of the plasma column follow the diverted field lines and leave the container to be neutralized at the outside wall of the diverter. From the diverter, the neutral gas may be extracted by pumps and the reactant material separated from the other constituents of the extracted gas for purposes of reinjection into the container with additional reactant material so as to continuously maintain reaction conditions. Since an outer shell of the plasma is the first to be withdrawn by the diverter, it will be appreciated that it is extremely inefficient to introduce new or recovered reactants near the walls of the container. The probability that the newly introduced reactants near the walls are substantially immediately removed by the diverter before performing beneficial functions in the central interior of the plasma column is untenably high. Therefore the injection of reactants in the very desirable forms of energetic-neutral atoms (i.e., ions preaccelerated to high energy and then neutralized) or molecular ions has been heretofore precluded in a stellarator because these forms of reactants break up near the container walls at the plasma densities employed for steady-state operation of a stellarator.

The present invention overcomes the foregoing difficulties encountered in the injection of energetic-neutral atoms or molecular ion reactants in a stellarator by providing a method and apparatus by which the density of the plasma column in a localized injection zone is periodically instantaneously diminished to facilitate the injection at this time of the above-noted forms of reactants well into the central axial region of the plasma column before breaking up and being trapped within the confinement field.

It is therefore a principal object of the present invention to inject replenishing reactant charges to the central axial region of a stellarator undergoing steady-state operation.

Another object of this invention is the provision of a method and apparatus for diminishing the density of a plasma column in a localized region thereof.

It is a further object of the present invention to provide a method and apparatus for injecting energetic-neutral atoms or molecular ions into a dense plasma column.

The invention, both as to its organization and method of operation, together with further objects and advantages thereof, will be better understood by reference to the following specification taken in conjunction with the accompanying drawing, of which:

FIGURE 1 is a diagrammatic illustration of an intense column of plasma as constrained radially by a uniform axially symmetric magnetic field;

FIGURE 2 is a graphical illustration of the axial intensity profile of the uniform magnetic field of FIG. 1;

FIGURE 3 is a diagrammatic illustration of the plasma column constrained by the magnetic field of FIG. 1 as modified by a magnetic field in accordance with the present invention during the early stages of its application;

FIGURE 4 is a graphical illustration of the axial intensity profile of the modified field of FIG. 3;

FIGURE 5 is a diagrammatic illustration of the plasma column in the modified magnetic field at a time later than that depicted in FIG. 3;

FIGURE 6 is a graphical illustration of the axial intensity profile of the modified field at the time of FIG. 5.

Figure 7:
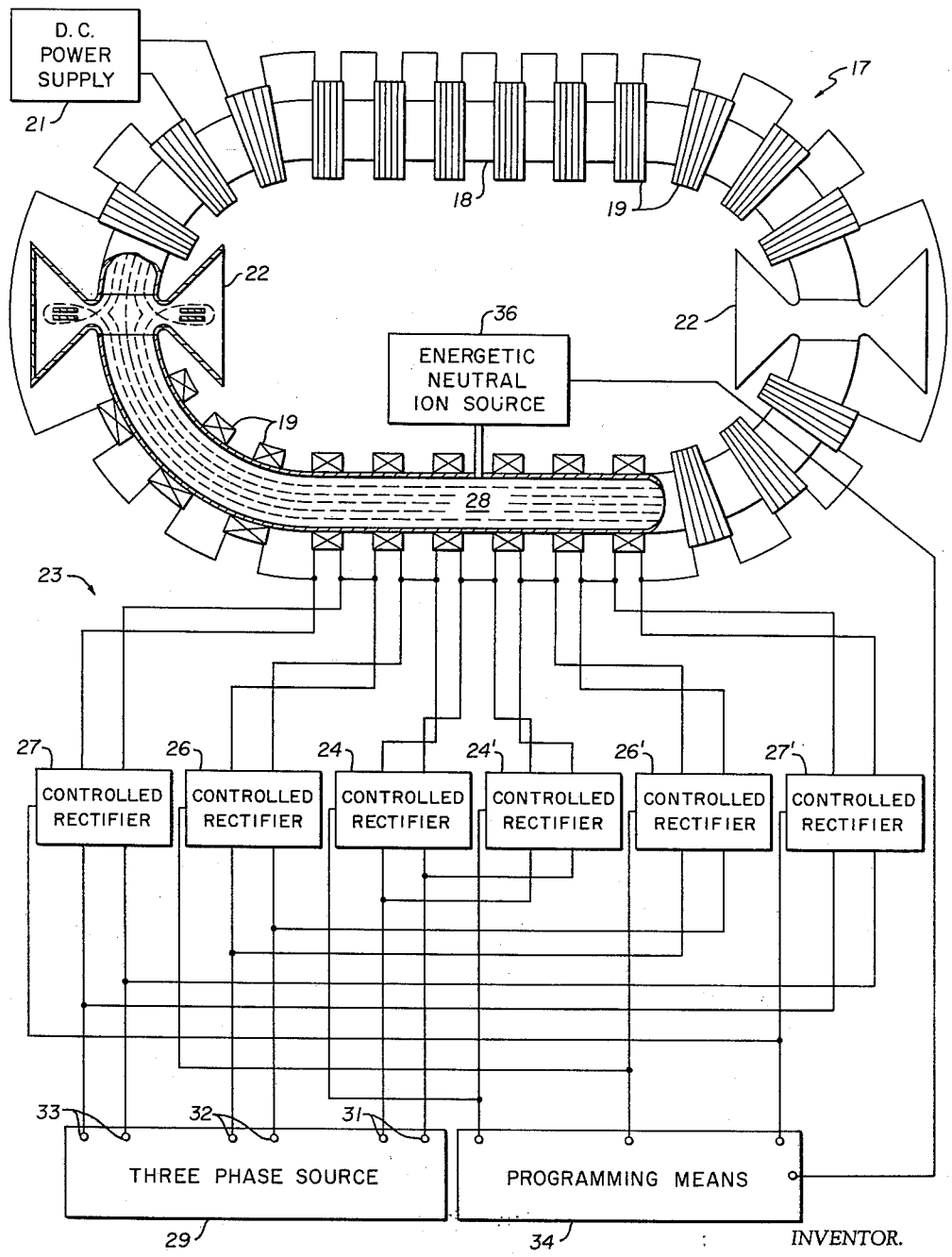
FIGURE 7 is a schematic sectional view of preferred apparatus in accordance with the present invention as embodied as an injector for a stellarator.

Considering now the invention in some detail, particularly as to the method thereof, and referring to FIG. 1 of the drawing, there is shown generally a plasma column 11 as constrained radially or collimated by an axially symmetric magnetic field 12 of uniform field strength $H_0$ (see FIG. 2). The density of the charged particle constituents of the plasma column 11, i.e., ions and neutralizing electrons, is relatively high and substantially uniformly distributed along the length of the column. Magnetically collimated ionized gaseous discharge columns of plasma of this type are commonplace in various charged particle sources and plasma heating apparatus such as a stellarator. Such a column of plasma as is well known is a potent ionizing agent and is effective in ionizing or breaking up neutral molecules or molecular ions substantially immediately upon their entry into the column. Hence neutral molecules or molecular ions directed transversely into the plasma column are broken up or ionized in the peripheral regions of the column and constrained thereat by the magnetic field before they can penetrate to the interior regions of the column near the axis. Hence in instances such as in a stellarator where it is desired that neutrals or molecular ions penetrate to the interior axial region of the plasma column prior to being ionized therein, a serious problem is posed.

To overcome the foregoing problem, in accordance with the present invention the plasma constituent particles are periodically swept magnetically from a localized region in the plasma column to establish a relatively low density in such region. Neutrals or molecular ions may then be directed into the low density region and penetrate substantially to the axis of the column before breaking up by collision processes with the plasma particles in the low density region. The low density region is then enveloped by the remainder of the plasma column with the newly injected particles being admixed with the previous plasma constituents by relaxation of the fields, normal diffusion processes, or the like. More specifically, the magnetic sweeping of plasma particles from a localized region of plasma column 11 is preferably periodically accomplished as depicted in FIG. 3 by first generating a pair of closely axially spaced gradientially-intensified reflector field regions 13, 14 of intensity $H_R$ greater than intensity $H_0$ (see FIG. 4) within magnetic field 12. The reflector field regions 13, 14 bound a central field region 16 of lesser initial intensity, $H_c$, disposed therebetween. Magnetic fields of this configuration $H_R$—$H_c$—$H_R$ are discussed in extensive detail relative to their effect on plasmas in my copending application, Serial No. 443,447, and accordingly are not detailed herein. For the purposes of the present disclosure it suffices to state that the reflector field regions 13, 14 of intensity $H_R$ are effective in reflecting or repelling the plasma charged particles axially therefrom to regions of lesser intensity, i.e., central field region 16 of intensity $H_c$ and the bounding regions of the field 12 of intensity $H_0$. Hence the plasma particles within the region 16 of relatively short axial length at the time of establishment of the reflector field regions 13, 14 are confined therein. Moreover, the plasma particles in plasma column 11 disposed outwardly from the reflector field regions 13, 14 being reflected therefrom are prevented from entering the central field region 16.

The reflector field regions 13, 14 are next moved outwardly apart through the plasma column 11 to positions of relatively wide axial spacing as depicted in FIGS. 5 and 6. By virtue of the charged particle reflective properties of the reflector field regions 13, 14, the plasma in the portions of column 11 outwardly adjacent the reflector field regions is urged in the direction of reflector field movement away from central field region 16. The intensity of the central field region simultaneously decreases from the initial intensity $H_c$ to substantially the intensity $H_0$ of the confinement field 12. The dimensions of the central field region 16 are hence materially increased without the entry of additional plasma particles thereinto. Consequently, the plasma particles originally trapped in the central field region occupy a much larger volume than before and therefore the plasma density in the central field region is materially lessened from that of the remainder of the plasma column 11. Neutral molecules or molecular ions may then be directed radially into the central field region of low density and by virtue of such low density have an increased probability of penetrating to the interior axial region of the column before suffering an ionizing collision and being trapped in the region 16. Subsequent to trapping of the injected material, the reflector field regions 13, 14 may be diminished to the intensity $H_0$ of the magnetic field 12 such that uniform field conditions as depicted in FIGS. 1 and 2 are again established. The plasma in the portions of the column which were previously outwardly adjacent the reflector field regions 13, 14 is hence now unrestricted from the previously defined central field region of the plasma column. The injected material hence is admixed with the remainder of the plasma in the column by interdiffusion of the plasma constituents and the region 16 is hence enveloped within the plasma column. Thereafter the foregoing steps of the method in accordance with the present invention may be periodically repeated. Alternatively, the reflector field regions may be relaxed to an intermediate intensity at which plasma particles can penetrate the same and be mixed with the injected material while gaining energy in the region 16 by virtue of the greater field intensity therein compared to that of the uniform confinement field.

Considering now preferred structure for conducting the method of the present invention and referring to FIG. 7 of the drawing, the invention is embodied therein as an injector for a stellarator as shown generally at 17. More specifically, as regards the stellarator 17, same includes any known means for the generation of a twisted toroidal magnetic confinement field in an evacuated space. Preferably such means is as disclosed in the previously referenced Spitzer patent and accordingly comprises a vacuum envelope 18 in the form of a twisted toroid or figure 8, although for purposes of simplicity and clarity of illustration, the envelope 18 is shown in the figure as a plane toroid. A uniform axially symmetric magnetic field is established longitudinally through envelope 18 by means of a plurality of axially spaced solenoids 19 disposed concentric with reference to the envelope and connected in series with a D.C. power supply 21. The magnetic field is accordingly of the general type depicted by FIGS. 1 and 2 of the drawing and hereinbefore discussed relative to the method of the invention.

The outer shell of force lines of the magnetic field near the walls of envelope 18 are diverted radially outward from the envelope in the two curved end sections thereof by means of magnetic diverters 22 communicably coupled therewith. The diverters 22 are of the same general character as the field diverter means disclosed in the previously referenced Spitzer patent and such means are accordingly not discussed in detail herein.

In the operation of a stellarator, a gaseous reactant, such as deuterium, is ionized within envelope 18 and confined in the axial region thereof as a relatively dense column by the magnetic field due to solenoids 19. The plasma is raised to high temperature and neutrons are produced by nuclear reactions therein by means including the magnetic field of solenoids 19 in the manner detailed in the previously referenced copending Spitzer application. Partially burned reactant, relatively low temperature plasma, and the like in the outer peripheral portions of the plasma column are extracted through the diverters 22 and fresh reactants are introduced to the envelope 18 in order to maintain steady-state operation. In order that the fresh reactants be introduced to the envelope in the desirable forms of energetic-neutral atoms or molecular ions, the stellarator 17 is modified in accordance with the present invention to include means for periodically establishing a low density injection zone in the plasma column according to the method hereinbefore described. More specifically, means are provided for establishing a pair of gradientially-intensified reflector field regions in the confining field of solenoids 19 with the reflector fields periodically moving in opposition from proximal substantially overlapping positions to distal positions of increased axial spacing, thence disappearing. It will be appreciated that many means exist in the art for establishing the moving reflector field regions, for example a pair of axially slideable direct current energized solenoids may be suitably mounted for mechanical translation in one of the straight sections of envelope 18. Such solenoids are then mechanically reciprocated between proximal and distal limits with the solenoids being correlatively energized at the proximal limit and de-energized or relaxed at the distal limit. Alternatively, the reflector fields may be moved electrically by programming the energization of pairs of solenoids (either several of the existing solenoids 19 of the stellarator or a separate set of injection solenoids) in corresponding outward succession. Both mechanical and electrical means for producing moving reflector fields are disclosed in more detail in my copending application, Serial No. 443,447. For purposes of illustration, an electrical injection circuit 23 is depicted in FIG. 7 of the drawing which coacts with a group of the existing stellarator solenoids 19 in a straight section of envelope 18 to produce moving reflector fields; however, the invention is in no way limited to such circuit in view of the alternative mechanical means mentioned previously as well as a variety of alternative circuits which will be apparent to those skilled in the electronics art.

As regards the specific injection circuit 23, it is to be noted that same preferably includes a plurality of controlled rectifiers 24, 24', 26, 26', 27, 27', for example conventional grid controlled rectifiers, which are respectively connected in energizing relation to pairs of the solenoids 19 of stellarator 17 in outward succession from a first pair in juxtaposition. These solenoids connected to the rectifiers define in envelope 18 a magnetically swept injection zone 28 in accordance with the present invention disposed substantially between transverse median planes of the solenoids connected to rectifiers 27, 27'. The controlled rectifiers are energized at their inputs by a multiphase power supply which in the case of the present embodiment is a three-phase source 29. More particularly, the rectifiers 24, 24' coupled to the central pair of solenoids 19 relative to injection zone 28 are coupled in parallel to the leading phase output 31 of three-phase source 29. The rectifiers 26, 26' coupled to the next outwardly successive pair of solenoids are coupled in parallel to the intermediate phase output 32 of source 29. Similarly, the rectifiers 27, 27' coupled to the most outward pair of solenoids are coupled in parallel to the lagging phase output 33 of the source 29.

The control inputs of controlled rectifiers 24, 24', 26, 26', 27, 27' are responsively connected to suitable programming means 34. Such programming means applies control voltage in the usual manner to the rectifiers to fire rectifiers 24, 24'; 26, 26'; and 27, 27' in respective sequence and to correlatively maintain conduction of same during substantially the entire durations of the positive alternations of the cycles of phased voltage appearing at the outputs 31, 32, 33 of three-phase source 29. The corresponding pairs of solenoids 19 coupled to the controlled rectifiers are thus energized in outward succession therefrom to superimpose upon the uniform confinement field generated by the solenoid pairs of gradientially-intensified reflector fields moving outwardly in axial opposition from the center to the ends of the injection zone 28 as depicted in FIGS. 4–6 of the drawing and hereinbefore described relative to the method of the present invention. Subsequent to termination of conduction in the last pair of rectifiers 27, 27', corresponding to the end of the positive alternation of the lagging phase voltage at output 33 of source 29, the positive alternation of the leading phase voltage is again initiated at output 31 of source 29 and rectifiers 24, 24' are again fired to initiate another cycle of magnetic sweeping by the moving reflector fields. The moving reflector fields in injection zone 28 hence periodically sweep particles from the plasma column in the manner previously described to periodically establish a relatively low plasma density in such injection zone.

In order to introduce fresh reactants to the plasma column in envelope 18, an energetic-neutral atom source 36 is advantageously provided in communicable radial attachment with the interior of envelope 18 at the midpoint of injection zone 28, i.e., between the pair of solenoids 19 connected to rectifiers 24, 24'. Molecular ion sources and other sources may also be alternatively effectively utilized. Energetic neutral ion sources generally comprise an ion accelerator which accelerates appropriate reactant ions such as deuterons to high energy followed by means such as a transverse jet target of vapor intersecting the accelerated ion beam to neutralize the energetic ions thereof by charge-exchange processes. The neutrals thus formed upon being ionized produce fast atoms of substantially the same energy as that of the ions prior to neutralization. For a more thorough understanding of energetic neutral ion sources reference may be had to University of California Radiation Laboratory report UCRL–4643, January 24, 1956, by Eugene J. Lauer.

Energetic neutral atom source 36 is preferably programmed to inject the neutral atoms to the injection zone 28 correlatively with the establishment of low plasma density conditions therein by the moving reflector fields. To facilitate the foregoing, programming means 34 is connected in delayed triggering relation to the energetic neutral ion source 36 to gate the source just after the most central pair of solenoids 19 are energized by rectifiers 24, 24'. More particularly, a delayed gate generator of conventional design may be included in the programming means and pulsed on after a slight delay by the initiation of control voltage applied to rectifiers 24, 24' and pulsed off by the termination of control voltage applied to rectifiers 27, 27'. The gate pulse from the gate generator may then be for example applied to the ion extraction structure of the ion accelerator portion of the energetic neutral source 36 to facilitate the direction of energetic neutral atoms into the injection zone correlaively during the movement of the reflector fields therethrough. Various specific circuits which may be employed in programming means 34 to accomplish the foregoing are well known and will suggest themselves to those skilled in the art. In summary, the operation of the injection circuit 23 and associated injection apparatus of the present invention generally follows from the method thereof. With the stellarator 17 undergoing continuous operation and an intense plasma column established within envelope 18, programming means 34 fires rectifiers 24, 24'; 26, 26'; and 27, 27' in respective succession to sequentially energize the corresponding pairs of solenoids 19 in injection zone 28 in an axially outward direction relative to the midpoint of the zone. As the reflector fields move outwardly, the plasma particles in the plasma column are swept axially outward thereby to materially decrease the plasma density in the injection zone 28. Just after the reflector fields begin to move axially outward, programming means 34 fires energetic neutral source 36 to direct a beam of energetic neutral reactant atoms into the injection zone between the moving reflector fields. The energetic neutral atoms significantly penetrate the low plasma density region so established between the reflector fields to substantially the axis of the plasma column before being ionized and trapped between the reflector fields. After termination of conduction of rectifiers 27, 27' and de-enerization of the solenoids 19 connected thereto, the intensity of the magnetic field within injection zone 28 becomes equal to that of the uniform confinement field established longitudinally of envelope 18 or is relaxed to an intermediate value. The fresh charge of energetic reactant ions previously trapped in the injection zone 28 between the reflector fields consequently is free to diffuse into the remainder of the plasma column to replenish the reactants continuously removed by diverters 22. Programming means 34 thereafter effects repetition of the foregoing injection cycle.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. A method of injecting reactants into a stellarator having a toroidal heated plasma column collimated by a uniform axial magnetic field and magnetic diverter means removing a peripheral layer of the column, comprising the steps of periodically generating a pair of gradientially-intensified partially overlapping reflector field regions of peak intensity $H_R$ greater than the intensity $H_0$ of the uniform magnetic field, translating both said reflector field regions axially apart to positions of increased axial spacing and thereat diminishing the peak intensity of both said reflector field regions to the intensity $H_0$, and directing reactant material selected from the group consisting of neutral atoms and molecular ions radially inward into said plasma column at a position intermediate said reflector field regions during translation of same.

2. In a stellarator including at least a toroidal vacuum envelope, a plurality of axially spaced solenoids disposed concentric with reference to the envelope and energized to generate an axial magnetic field therethrough for confining and heating a column of plasma extending axially through the envelope, and magnetic diverter means diverting a peripheral layer of the plasma column radially outward from the envelope, improved injection apparatus for introducing reactants to said plasma column, comprising magnet means disposed concentrically about said envelope for periodically generating a pair of axially symmetric closely axially spaced reflector fields therein having gradientially increased intensities relative to the intensity of said confining field, means coupled to said magnet means for moving both said reflector fields in axial opposition to distal positions of increased spacing, means coupled to said magnet means for decreasing the intensity of both said reflector fields to zero at said distal positions, and reactant source means communicating with the interior of said envelope between said reflector fields for directing reactant selected from the group consisting of neutral atoms and molecular ions thereto during movement of the reflector fields.

3. In a stellarator including at least a toroidal vacuum envelope, a plurality of axially spaced solenoids disposed concentric with reference to the envelope and energized to generate an axial magnetic field therethrough for confining and heating a column of plasma extending axially through the envelope, and magnetic diverter means diverting a peripheral layer of the plasma column radially outward from the envelope, an injector for introducing fresh reactants to the plasma column within the envelope comprising energizing means connected to a plurality of said solenoids in a localized region for periodically applying energizing current to pairs of the solenoids in corresponding outward succession from a first pair thereof in juxtaposition at the midpoint of the localized region to generate a pair of spaced gradientially-intensified reflector field regions superimposed upon said magnetic field and moving distally through the localized region, a reactant source for generating reactant material selected from the group consisting of neutral atoms and molecular ions communicating radially with the interior of said envelope at a position between said first pair of solenoids, and gate means coupled between said energizing means and said source for rendering the source operative during movement of said reflector field regions.

4. In a stellarator including at least a toroidal vacuum envelope, a plurality of axially spaced solenoids disposed concentric with reference to the envelope and energized to generate an axial magnetic field therethrough for confining and heating a column of plasma extending axially through the envelope, and magnetic diverter means diverting a peripheral layer of the plasma column radially outward from the envelope, an injector for introducing fresh reactants to the plasma column within the envelope comprising a plurality of controlled rectifiers correspondingly connected to a plurality of said solenoids in a localized injection zone of said envelope, said rectifiers each having an energy input and a control input, a multiphase power source having a plurality of successive phase outputs correspondingly connected in energizing relation to the energy inputs of pairs of said rectifiers in outward succession with the leading phase output being connected to the rectifiers connected to the most central pair of solenoids in said injection zone, programming connected to the control inputs of said rectifiers to fire same in respective outward sequence by pairs and to correlatively maintain conduction of the rectifiers during the positive alternations of the cycles of phased voltage correspondingly applied thereto from said multiphase power source, a reactant source for generating reactant material selected from the group consisting of neutral atoms and molecular ions communicating radially with the interior of said envelope intermediate said central pair of solenoids in said injection zone, and means connecting said programming means to said reactant source in delayed triggering relation thereto to gate the reactant source on subsequent to the initiation of a positive alternation of leading phase voltage of said multiphase source and gate the reactant source off upon the termination of a positive alternation of lagging phase voltage of said multiphase source.

5. In a stellarator, an injector according to claim 4 further defined by said reactant source being a neutral atom source.

6. In a stellarator, an injector according to claim 4 further defined by said reactant source being a molecular ion source.

References Cited in the file of this patent

UNITED STATES PATENTS

| | | |
|---|---|---|
| 2,892,114 | Kilpatrick | June 23, 1959 |
| 2,910,414 | Spitzer | Oct. 27, 1959 |
| 2,946,914 | Colgate et al. | July 26, 1960 |
| 2,969,308 | Bell et al. | Jan. 24, 1961 |

OTHER REFERENCES

Proceedings of the Second United Nations International Conference on the Peaceful Uses of Atomic Energy, volume 32 (1958), pages 273–278.